Aug. 30, 1927.
C. A. HENNICKE
1,640,989
DOOR CONTROL
Filed May 6, 1925
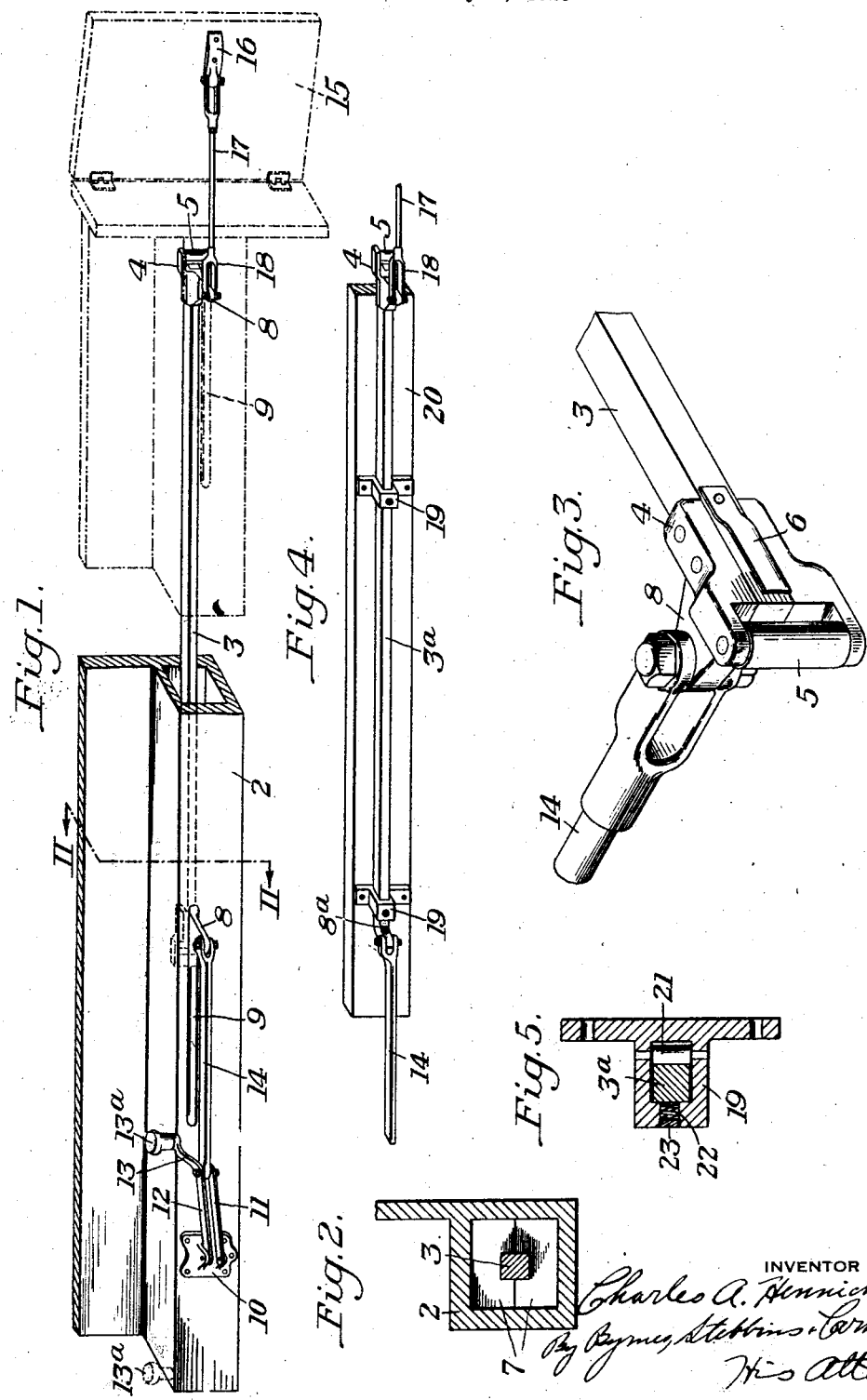

Patented Aug. 30, 1927.

1,640,989

UNITED STATES PATENT OFFICE.

CHARLES A. HENNICKE, OF BUFFALO, NEW YORK, ASSIGNOR TO THE EBERHARD MANUFACTURING COMPANY, OF CLEVELAND, OHIO, A CORPORATION OF OHIO.

DOOR CONTROL.

Application filed May 6, 1925. Serial No. 28,528.

The present invention relates to door operating means, and more particularly to means for opening and closing the doors of vehicle bodies, such as those of the "pay as you enter" type of busses.

I have provided a door operating mechanism of simple construction adapted to be so arranged beneath the lower windshield at the front of a bus body as to be under full control of the chauffeur or driver while collecting fares from passengers entering the vehicle while leaving an open and unobstructed space under said windshield for a fare box within easy reach of the driver and for the gear shift and other vehicle control levers.

In the accompanying drawings:

Figure 1 is a view illustrating a preferred embodiment of my invention applied to the usual hollow casing beneath the lower windshield at the front of a bus body;

Figure 2 is a section on the line II—II of Figure 1;

Figure 3 is a detail perspective view illustrating the construction of the slide heads at the ends of the slide rod;

Figure 4 is a view illustrating a slight modification of the invention; and

Figure 5 is a detail sectional view taken through one of the slide rod guides used in the construction shown in Figure 4.

Referring to the construction shown in Figures 1, 2 and 3, 2 designates the hollow cross bar or frame member beneath the lower windshield at the front of a bus body. Arranged within this hollow bar or frame member is the slide rod 3 of the door operating mechanism. Attached to each end of this slide rod is a head 4 having a bifurcated extremity between the arms of which is arranged an anti-friction roller 5 which is journaled in said arms and is of a slightly greater diameter than the thickness of the slide rod. Attached to the rear face of each head is a leaf spring 6, the spring being attached to the head at one end and having its body portion bent to lie in spaced relation to the rear face of said head. The slide rod 3 slides in an opening formed in guide blocks 7 arranged within said hollow bar or frame member.

Each head 4 has an integral lug 8 projecting outwardly from its front face and extending through an elongated slot 9 in the front wall of the hollow bar 2. Attached to the front wall of the hollow bar is a bracket 10 having spaced ears to which links 11 and 12 are pivoted at one end. The link 12 has an integral extension 13 on the end of which is mounted a revolving knob 13ª. A link 14 is pivoted at one end to the links 11 and 12 between the same and at its other end to one of the lugs 8. The door 15 of the bus, which is indicated in dotted outline, has a plate 16 attached thereto. This plate is connected by a connecting rod having adjustable yokes 18 at its ends with the lug 8 of the head 4 at the right-hand end of the slide rod 3. The parts 11, 12, 13 and 13ª constitute an operating lever or handle which is adapted in the position shown in Figure 1 to hold the door closed and when swung to the left to hold the door open.

The arrangement shown is intended to operate an inward swinging folding door. To open the door the driver pulls the handle knob towards him and to the left, and to close the door the reverse motion is necessary. If it is desired to operate an outward swinging door, the connecting rod 17 is adjusted while the door is open and the handle in the position shown in Figure 1. With the parts so arranged the operator would pull the handle towards him and to the right in order to open the folding door. The leaf springs 6 are rounded transversely, as shown in Figure 3, and are adapted to slidably engage the rear wall of the hollow casing. These springs tend to thrust the slide rod outwardly, but are adapted to yield to permit the rollers 5 to contact with the rear wall of the hollow bar. It will thus be seen that the springs 6 and rollers 5 form anti-friction bearings for the ends of the slide rod which tend to maintain the slide rod parallel with the front and rear walls of the hollow bar when the same is reciprocated in the bearing blocks 7, thus preventing the slide rod from binding in said guide blocks. These anti-friction bearings also tend to prevent any rattling of the parts.

While I prefer to arrange the slide rod inside of a hollow frame member because this leaves more room for the attachment of the fare box and also because of neatness of appearance, the slide rod may be used on the outside of the cross bar or other supporting member. An arrangement of this character is shown in Figures 4 and 5. In the construction shown in these figures I have illustrated a slight modification of the slide rod. The slide 3ª shown in these figures is provided at its right-hand end with a head 4, but the left-hand end of the slide rod instead of having a head 4 attached thereto is bent outwardly to provide the integral lug 8ª for the connection of the connecting link 14. The slide rod 3ª is guided in guide brackets 19 attached to the frame member 20. Each of these guide brackets has a bearing roller 21 journaled therein and against which the slide rod is pressed by a coil spring 22. The coil spring is held in a bore in the guide bracket by means of a removable nut 23. It will be seen that the arrangement of the rollers 21 and springs 22 in the guide brackets provides anti-friction bearings for the slide rod and prevents rattling of the parts in operation.

While I have shown and described certain preferred embodiments of my invention, it will be understood that the invention is not limited to its illustrated embodiments, but that it may be otherwise embodied within the scope of the appended claims without departing from the spirit of the invention.

I claim:

1. A door control, comprising a slide rod adapted to be mounted for reciprocation upon a portion of a vehicle or other body, anti-friction means associated with said slide rod, an operating lever adapted to be connected to said body, a link connecting one end of said slide rod with said lever, and a connecting rod connected to the other end of said slide rod and adapted to be connected to a door, said link and said connecting rod being movable in the same plane as the door and the lever, substantially as described.

2. A door control, comprising a slide rod adapted to be mounted for reciprocation upon a portion of a vehicle or other body and having an anti-friction roller at one end thereof, an operating lever adapted to be connected to said body, a link connecting one end of said slide rod with said lever, and a connecting rod connected to the other end of said slide rod and adapted to be connected to a door, said link and said connecting rod being movable in the same plane as each other and in the same plane as the lever and door, substantially as described.

3. A door control, comprising a slide rod adapted to be mounted for reciprocation upon a portion of a vehicle or other body and having an anti-friction roller at one end thereof together with a leaf spring adapted to bear upon said portion and tending to maintain the roller out of contact therewith, an operating lever adapted to be connected to said body, a link connecting one end of said slide rod with said lever, and a connecting rod connected to the other end of said slide rod and adapted to be connected to a door, substantially as described.

4. A door control, comprising a slide rod adapted to be mounted for reciprocation upon a portion of a vehicle or other body, a head connected to each end of said rod and having an anti-friction roller journaled therein, a leaf spring on the back of each head adapted to bear upon said portion and tending to maintain the associated roller out of contact therewith, an operating lever adapted to be connected to said body, a link connecting one end of said slide rod with said lever, and a connecting rod connected to the other end of said slide rod and adapted to be connected to a door, substantially as described.

5. A door operating mechanism including a rod, means for slidably supporting the rod, a link pivotally connected to one end of the rod, a door fixture pivotally secured to the link, a second link pivotally secured to the other end of the rod, a pivoted operating lever, said second link being pivotally connected to the operating lever, said operating lever being movable past the line of centers of the pivots of the second link in fully opening or closing the door whereby the lever holds the door open or shut, the pivots of all the pivotal connections being in the same plane, said first link and said rod being substantially parallel when the door is fully open.

6. A door operating mechanism including a rod, an offset arm at each end of the rod, means for slidably supporting the rod, a link pivotally connected to the offset arm at one end of the rod, a door fixture pivotally secured to said link, a second link pivotally secured to the arm at the other end of the rod, and a pivoted operating lever, said second link being pivotally connected to the operating lever, said operating lever being movable past the point of dead center with respect to the link attached thereto in fully opening or closing the door, whereby the lever holds the door open or shut.

In testimony whereof I have hereunto set my hand.

CHARLES A. HENNICKE.

CERTIFICATE OF CORRECTION.

Patent No. 1,640,989.     Granted August 30, 1927, to

CHARLES A. HENNICKE.

It is hereby certified that error appears in the printed specification of the above numbered patent requiring correction as follows: Page 2, after line 113, insert the following as claim 7;

7. A door control including a supporting element, a rod slidably guided on the supporting element, a horizontal link pivotally connected with each end of the rod through vertical pivots, an operating lever connected with one link by a vertical pivot, and a door fixture pivotally connected with the other link through a vertical pivot one of the links being lengthwise adjustable, substantially as described.

and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.